(12) United States Patent
Shalla et al.

(10) Patent No.: US 7,984,170 B1
(45) Date of Patent: Jul. 19, 2011

(54) CROSS-DOMAIN COMMUNICATION IN DOMAIN-RESTRICTED COMMUNICATION ENVIRONMENTS

(75) Inventors: Zachary M. Shalla, Seattle, WA (US); Ross V. Korsky, Auburn, WA (US); Nicholas J. Giordano, Jr., Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 225 days.

(21) Appl. No.: 12/362,377

(22) Filed: Jan. 29, 2009

(51) Int. Cl.
*G06F 15/16* (2006.01)
(52) U.S. Cl. ......... 709/229; 709/225; 709/217; 709/218
(58) Field of Classification Search .......... 709/227, 709/228, 229, 225, 206, 217, 218; 713/185; 370/389; 380/270
See application file for complete search history.

(56) References Cited

U.S. PATENT DOCUMENTS

| | | | |
|---|---|---|---|
| 2005/0213763 A1* | 9/2005 | Owen et al. | 380/270 |
| 2006/0053224 A1* | 3/2006 | Subramaniam | 709/227 |
| 2007/0136603 A1* | 6/2007 | Kuecuekyan | 713/185 |
| 2008/0080493 A1* | 4/2008 | Weintraub et al. | 370/389 |
| 2008/0281921 A1* | 11/2008 | Hunt | 709/206 |
| 2008/0313648 A1* | 12/2008 | Wang et al. | 719/315 |

* cited by examiner

*Primary Examiner* — Le Luu
(74) *Attorney, Agent, or Firm* — Kilpatrick Townsend and Stockton LLP

(57) ABSTRACT

A messaging frame can be used to allow different domains to communicate in an electronic environment that are otherwise prevented from directly communicating. A messaging frame or other communication element can be configured to receive messages or communications from any frame, object, or element in the same domain as the messaging frame. The messaging frame then can switch to a target domain in order to provide the message or communication to a frame, object, or element in the target domain. The messaging frame can include an interface definition that allows only approved messages to be passed between domains, such that the risk of malicious attack is minimized.

21 Claims, 6 Drawing Sheets

CROSS-DOMAIN COMMUNICATION IN DOMAIN-RESTRICTED COMMUNICATION ENVIRONMENTS

BACKGROUND

As an increasing amount of information is being provided electronically, the number of sources providing such content is increasing as well. In many cases, a user browsing a Web page through a browser application, for example, might simultaneously view content from multiple sources, each of which might have a distinct domain, host address, or other such source identifier from which the content is provided. In many cases, the user will be unaware that the content is coming from multiple sources other than variations in aspects such as style or layout.

In order to enhance the user experience, many of these content providers would like to be able to communicate information back and forth such that a page displaying content from multiple providers and/or multiple domains can provide a consistent experience based on user interaction. For example, a user viewing an item in an electronic marketplace might select to purchase an item using a "buy it" option in a frame provided from a first domain. There might be other frames on the page corresponding to other domains that can benefit from knowledge that the user purchased the item. For example, if a second domain is advertising alternative items available, once an item is purchased that domain might instead desire to advertise accessories for the purchased item. In any case, it can be desirable to update content in certain domains in response to actions or occurrences in other domains.

Such an approach is not straightforward, however, as most existing browsers and other such applications impose restrictions on cross-domain requests and cross-site scripting (XSS). Thus, a frame on a Web page corresponding to a first domain cannot send information to a second frame on the page corresponding to a second domain. Further, various frames or elements from a common provider may still correspond to different domains, or switch between different domains, such as secure (e.g., using HTTPS) and non-secure (e.g., using HTTP) domains. Thus even pages from the same provider might be unable to determine information about a frame, object, or other element of the page if that element is from another domain.

Further still, for content providers such as electronic marketplaces or electronic retailers, if these providers take advantage of electronic payment cards (e.g., credit or debit cards), then the provider also must comply with payment card industry data security standards (such as PCI DSS). In order to maintain compliance, each of the providers for a Web site has to also be PCI compliant to avoid potential vulnerabilities in the site, which in many instances will not be practical. Thus, while it may be desirable to pull in content from third party providers and interact with that content via JavaScript or another appropriate language, such interaction would generally not comply with the PCI or other such standards. Many other such standards exist for types of content or interaction.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more the aforementioned and other deficiencies experienced in conventional approaches to providing and managing content across multiple domains in an electronic environment. Systems and methods in accordance with various embodiments provide for a communication element, such as a hidden messaging frame, that is able to switch or transition between domains in order to allow for the communication of content between elements of different domains. A page of content might include multiple such messaging frames, or can include logic that allows such a messaging frame to work with multiple domains for various portions of the page. Generally, a "domain" refers to an organized collection of network devices, applications, and/or services, which typically are identified using a domain "name." Thus, a single content provider might utilize multiple domains for different purposes or having different aspects or capabilities. Further, different providers typically will utilize different domains. Although a common use of the word "domain" in such a context often currently refers to Internet-based technology, it should be understood that domains can be used in any appropriate network setting, and that advantages of embodiments discussed and suggested herein can be applied to any of these networks as appropriate.

Figure 1:
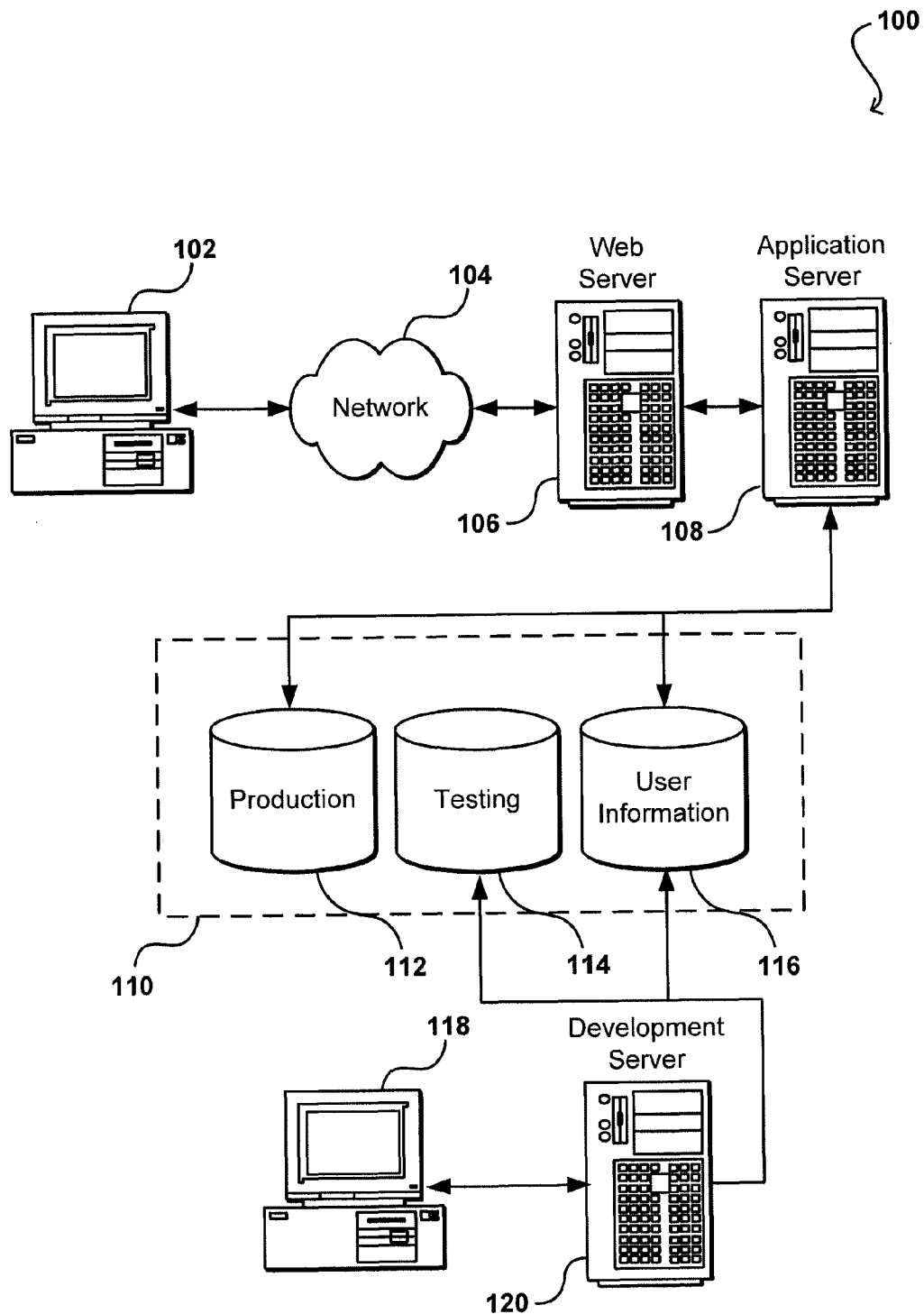
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple sources might be used to provide content for different portions of a generated page. As discussed above, however, sometimes a provider such as an electronic marketplace might wish to generate pages that pull content from multiple domains, either from the same provider or from other providers. The electronic environment in such a case might include additional components and/or other arrangements, such as those illustrated in the configuration 200 of FIG. 2. In this example, a user of a client device 202 might submit a request for content across a network 204 that is directed to at least one provider 206, 208. In order to respond to the request, such as by sending a reply page to be displayed on the client device 202, content might be provided by a Web server 210 of a first provider, which might utilize one or more application server 212, 214 to pull content from one or more data repositories 216, 218 and generate page content to be rendered by the client device 202. In some cases, each application server 212, 214 for the provider might correspond to a different domain. For example, a first application server 212 might correspond to a non-secure domain, which provides content such as landing pages or static content pages. A second application server 214 might correspond to a secure domain, which might provide functionality such as virtual shopping carts, online payments, and other such secure operations.

In order to provide all necessary content for the page, at least a portion of the content also might be provided by at least one other provider 208. In this case, a Web server 220 might serve content from an application server 222 able to pull content from at least one repository 224, and the server 222 might send the content directly to the client device 202 across the network 204 or in some embodiments might send the content to the first provider 206 such that the first provider sends all page content together. In this example, the second provider 208 also might correspond to a separate domain. Although two content providers are shown, and the example is described with respect to three domains for a page, it should be understood that any of a number of providers and/or domains could be used to provide content for a page as known or used in the art.

Figure 2:
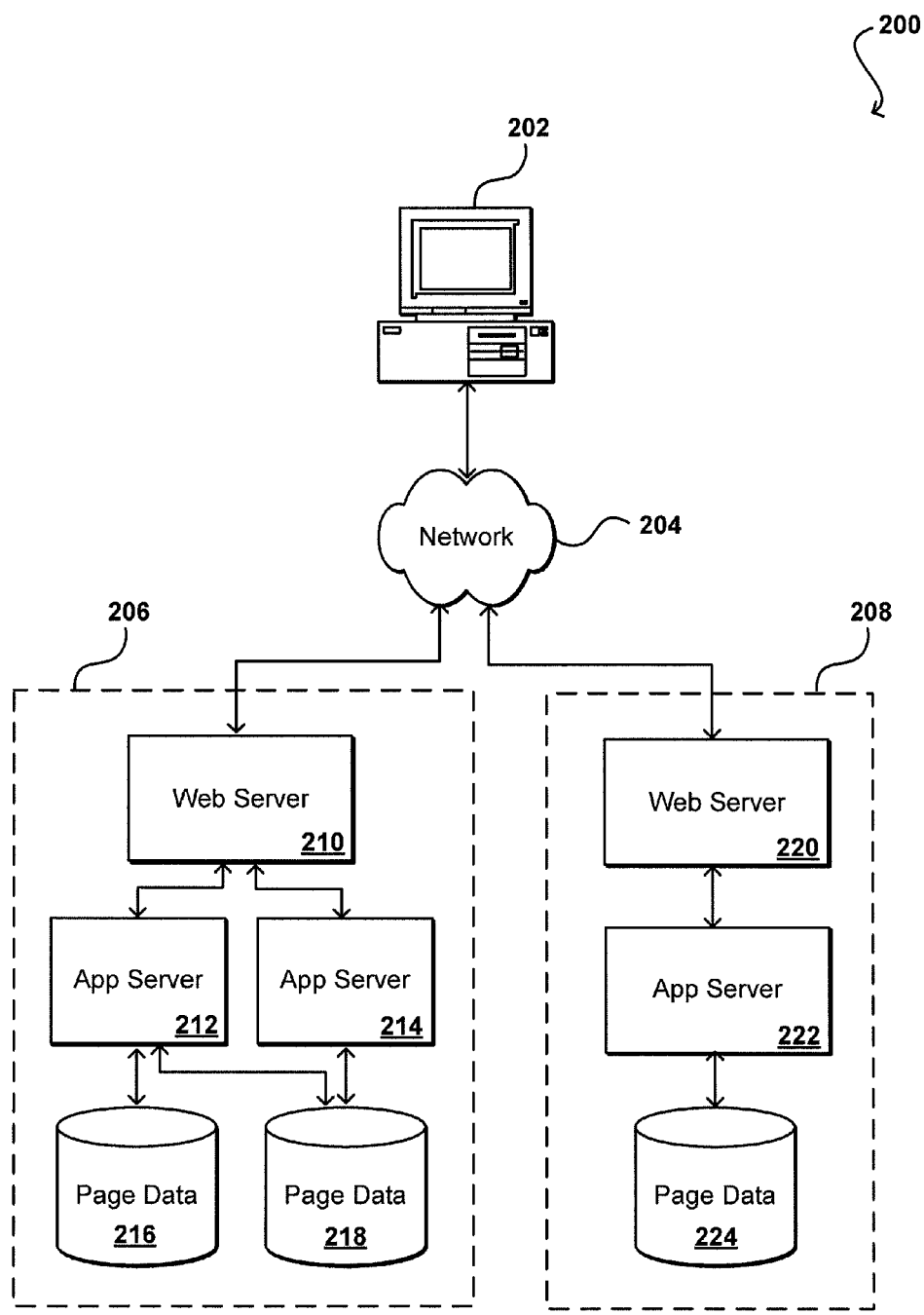
FIG. 2 illustrates a system for providing a user with content from multiple domains that can be used in accordance with one embodiment.
Figure 3A:
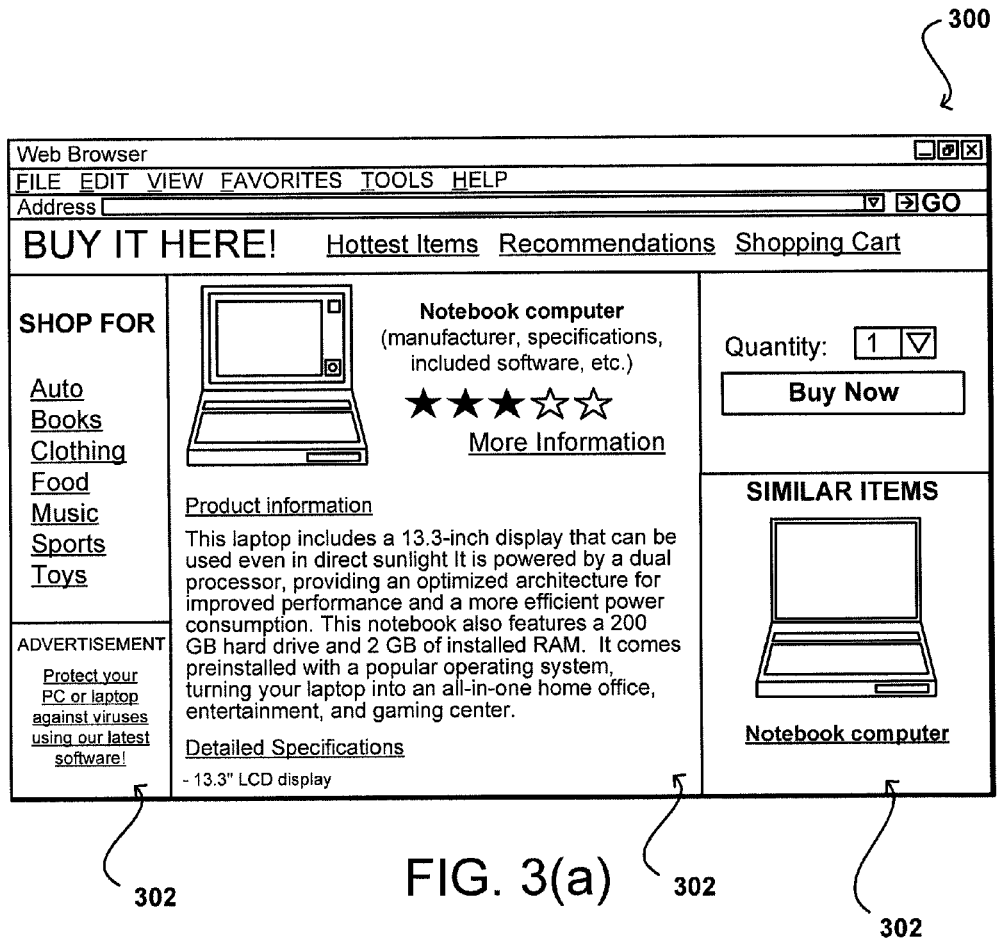
FIGS. 3(a) and 3(b) illustrate frames of content corresponding to multiple domains that can be used in accordance with one embodiment.
Figure 3B:
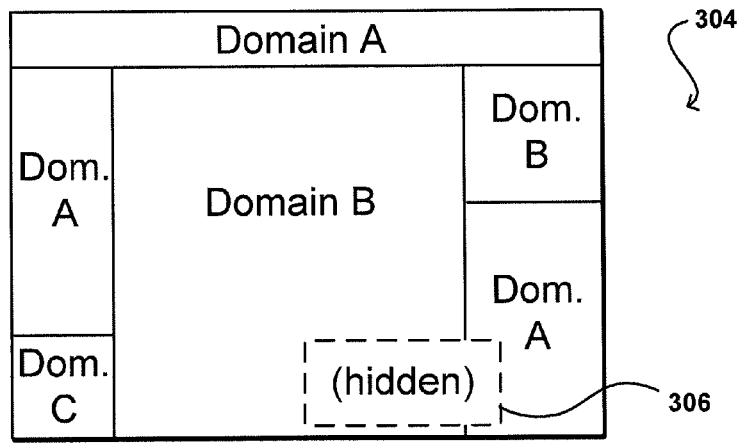

FIG. 3(*a*) illustrates an example of a page 300 that could be generated by a system such as that illustrated in FIG. 2. In this example, the page includes a number of frames 302 in a frameset that each typically display content derived from a specific location (e.g., a specified uniform resource locator (URL)). As shown, the frames can provide various functionality, such as providing a display page of information about an item, the ability to purchase the item, providing related advertisements, providing the ability to navigate to other content, etc. As discussed, this functionality can be provided from sources corresponding to different domains.

For example, FIG. 3(*b*) illustrates a layout 304 indicating a domain corresponding to each frame shown in the example page of FIG. 3(*a*). In this example, the overall page or site accessed by the user is provided from Domain A, which can correspond to a first provider of the site. In this case, frames corresponding to a title bar, a set of navigational links, and a link to a similar item are all provided from Domain A. Even though the overall marketplace is provided from Domain A, the display page providing information about the item being viewed comes from Domain B, as well as the ability to purchase the item. This might be due to the fact, for example, that the item is actually offered by, and purchased from, a separate provider. In other examples, this might be because the provider simply uses a different domain for content such as item information and purchasing.

As discussed, a potential problem with sourcing content from multiple domains is that one frame on a page cannot obtain information about another frame on a page, at least not without generating compliance issues in certain cases. Thus, if an item is purchased from Domain B, for example, there is no easy way to update the content of state of Domain A or any other domain for the page.

An approach in accordance with one embodiment addresses at least some of these and other such issues by taking advantage of a domain-variant communication element, here taking the form of a messaging frame 306. In this example, the frame is a "hidden" frame that has a "hidden" style with zero width and zero height, but still represented in the frameset of the page. The content of the messaging frame can be alternatively sourced from multiple domains, such that at any given time the messaging frame can be of the same domain as a desired frame of the page, whereby that frame can communicate with the messaging frame.

Figure 4A:
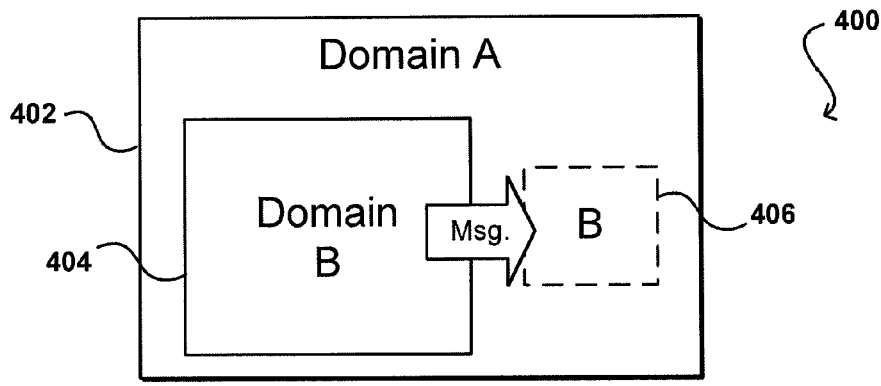
FIGS. 4(a)-4(c) illustrate use of a domain-variant messaging frame that can be used in accordance with one embodiment.
Figure 4B:
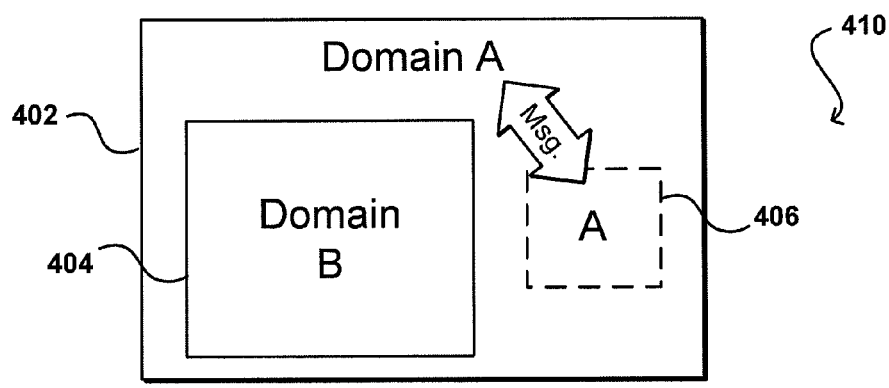
Figure 4C:
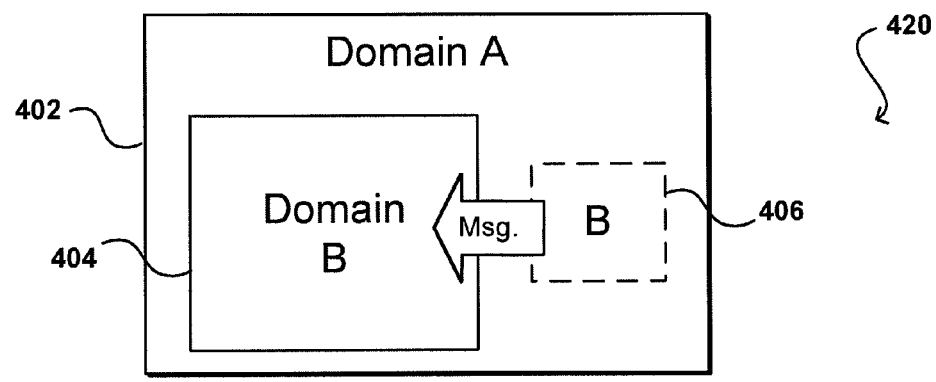

For example, as shown in the state 400 of FIG. 4(*a*), a messaging frame is set to correspond to Domain B, allowing any frame 404 of the page also corresponding to Domain B to communicate with the messaging frame 406, such as by sending a hashed message as discussed elsewhere herein. After receiving the message, the messaging frame can switch to correspond to Domain A, as illustrated in the state 410 of FIG. 4(*b*), whereby the messaging frame can communicate with any other frame 402 corresponding to Domain A. For example, the messaging frame can send a message conveying information originally sent from Domain B, and can receive a confirmation message from Domain A. The messaging frame 406 then can switch back to Domain B, as illustrated in the state 420 of FIG. 4(*c*), and can send a confirmation message to Domain B that the message was received by Domain A. It should be understood that confirmation messages are not required, and any of a number of other or additional messages can be passed back and forth as desired. Thus, control and use of at least one messaging frame can provide for communication between domains without violating cross-domain restrictions or violating compliance standards.

As discussed, any frame on the page that is in the same domain as the messaging frame at a given time can communicate with the messaging frame. Thus, a common domain can modify the location and/or hash specified to the messaging frame, and can set the location of the page corresponding to the messaging frame to be a page within the target domain for communication. For example, a frame can pass a call to the messaging frame such as:

go to domain.com/blank#message&recipient=pagetype& host=//www.foo.com/blank

The example call above provides a target location and domain for the messaging window, here specifying a designated blank page of the "domain.com" domain. The call also includes a message to be sent to that location, which can be specified in a hash, and can also include information about how the message should be processed. The call also includes a host name, to specify the location or page to which the messaging frame should return.

As discussed, a messaging frame can correspond to a frame having no width or height but that is still part of the frameset of the underlying page. The frame can have appropriate properties set, such as an index of a value such as −10 that will prevent a user from cycling to, or otherwise accessing, that frame in any way. As should be understood, even when the target of the frame switches domains, the hidden frame itself still remains part of the underlying document, the code of which is provided by the same provider and domain as the underlying page. Further, while a hidden frame is used for explanation purposes, it should be understood that any appropriate object or element can be used that enables communication with another element or object on a page, and that can switch domains to communicate with another element or object. Further, although many examples are given with respect to an Internet-inclusive environment, it should be understood that advantages and implementations can be obtained in other applications, such as any electronic environment wherein content is provided from multiple sources, and direct communication between those sources or that content is prohibited or restricted as discussed or suggested herein.

Figure 5:
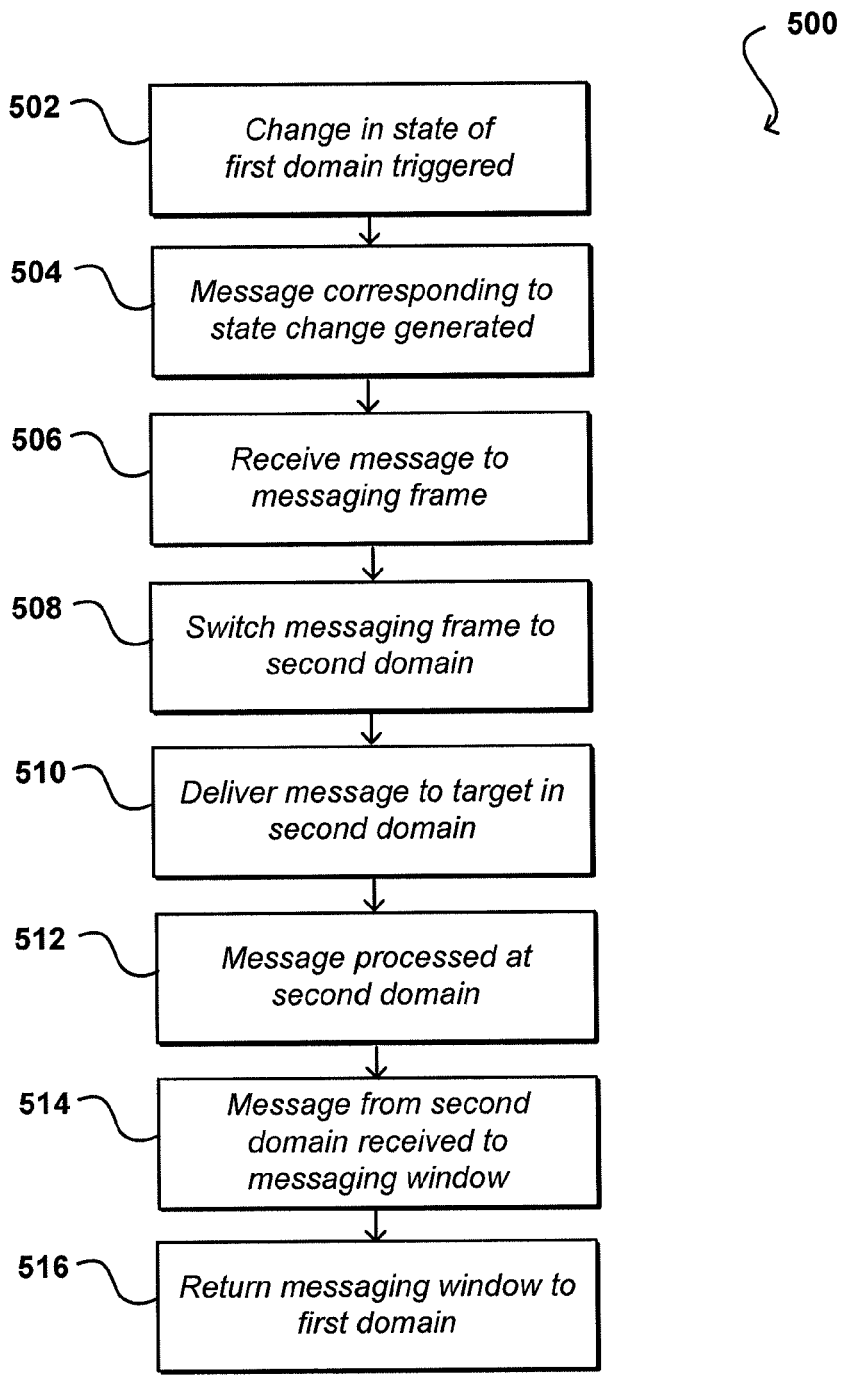
FIG. 5 illustrates a first example process for utilizing a domain-variant messaging frame in accordance with one embodiment.

Such an approach allows a frame corresponding to a first domain to set the location of the messaging frame to another domain. FIG. 5 illustrates steps of an example process 500 for communicating across multiple domains in accordance with one embodiment. In this example, a page includes multiple frames of content, with at least two of those frames having content corresponding to different domains. A change of state is triggered for a frame corresponding to a first domain 502. As discussed above, this can correspond to a user initiating an action or any other appropriate occurrence. In one example, a page such as a detail page can include at least one frame having a state that can be manipulated by a user, such as by a user clicking an "add to cart" or similar element. As the state changes, the displayed content can change as well.

As a result of the change in state, the first domain generates a message corresponding to the change in state 504, including appropriate state change information, and the message is received to a messaging frame 506 in the same domain. The message can be any appropriate message as discussed elsewhere herein, which can include information corresponding to the change in state as well as information indicating a domain to which the messaging frame should switch to deliver the communication. When a confirmation portion or layer loads, for example, a message can be sent to the messaging frame indicating that the messaging frame should switch to a specific domain with a specific message, indicating the updated state. As discussed, the message can be included in the hash or can be included in any other appropriate location, such as in the content, header, or tags of the page or location specified in the hash. In an application where a substantial amount of information is passed relatively infrequently, it might be desirable to pass information using the content of the page, etc.

In response to receiving the message, the messaging frame switches to the second domain 508 and delivers the message to the target 510. Once the messaging frame switches to the second domain, the first domain loses all control over, and access to, the messaging frame until the frame returns to the first domain. The second domain, however, is now able to receive the message from the messaging frame and otherwise communicate with the messaging frame. For example, the second domain can determine the location, parse the message in the hash, and process the message 512. The second domain then can send a message to the messaging frame 514 instructing the messaging frame to return to the first domain. As discussed, the return location or host address may have been specified in the initial message from the first domain. While in this example the messaging frame returns to the first domain 516, it should be understood that the messaging frame could be instructed to switch to a third domain corresponding to another frame on the page. The first domain then again is able to communicate with the messaging frame. Thus, rather than opening full JavaScript or similar access for aspects such as AJAX calls and framesets, such a communication approach allows for communication and actions based upon a predefined application programming interface (API) between the two consenting providers of the domains. Such an approach thus is relatively robust against attack, as an unintended third party can only cause actions to occur that are already approved actions.

The ability to communicate across multiple domains enables Web pages, Web sites, and other such elements to provide a consistent look and feel, and consistent performance, even when portions of those pages and/or sites are provided from different domains. Further, such an approach allows content providers to provide content as services, subscriptions, portable pipelines, or other such elements that can be added to any page of any appropriate provider, and can allow communication between elements so that the content can be controlled or manipulated in accordance with other elements or actions with respect to the page. For example, a provider can create a portable checkout pipeline that can be added to any Web site to provide checkout and payment functionality, and the cross-domain communication allows the entire checkout process to be completed while appearing to be in a specific domain or from a specific provider. For example, if a user accesses an electronic marketplace to make a purchase, the user can have the impression that all functionality is provided by the electronic marketplace even if the checkout functionality is provided by another provider from another domain. Similar functionality can be used to provide advertisements or other content from other domains, provide for user authentication, etc., but have the same style and correspond to information currently being displayed to the user.

Figure 6:
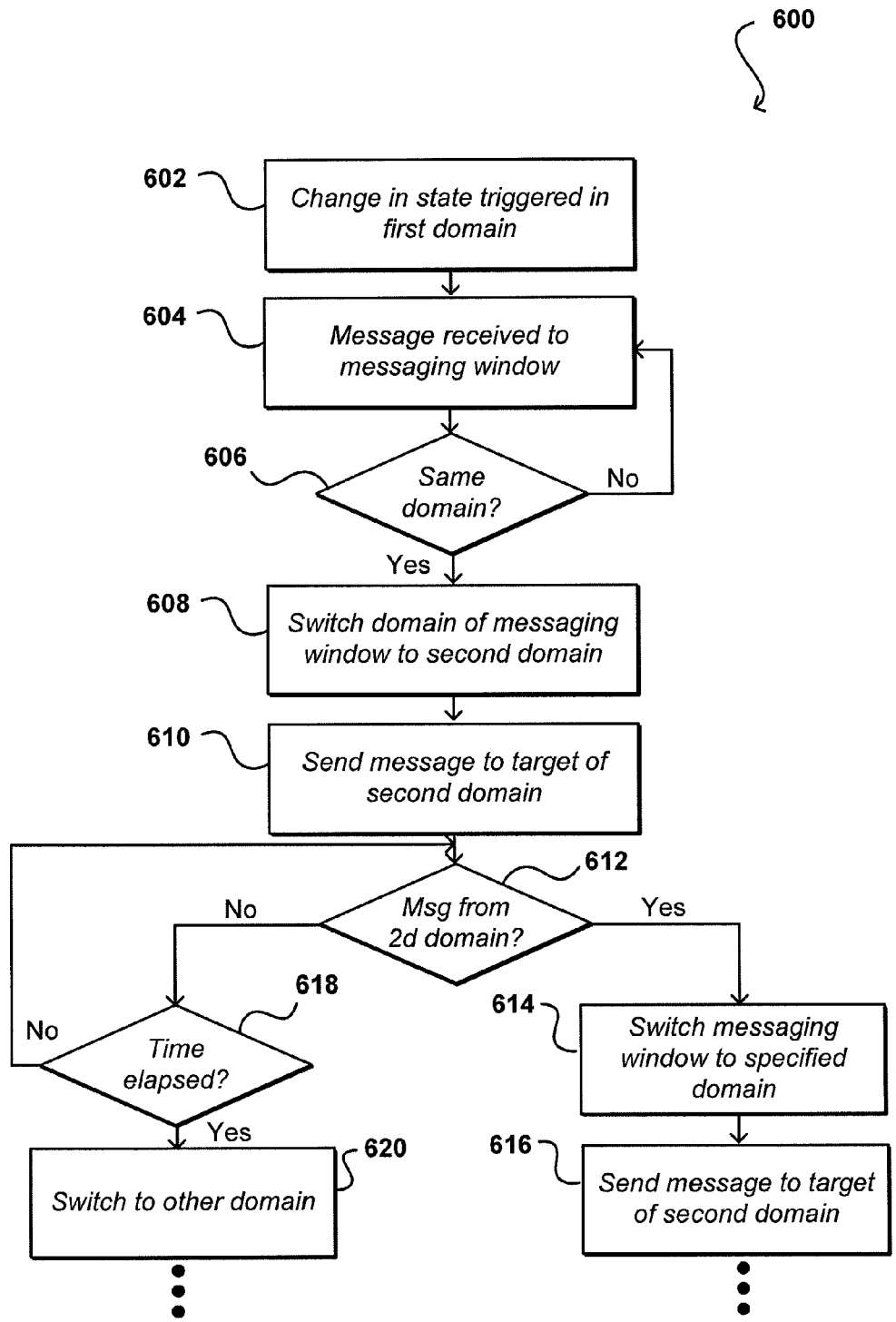
FIG. 6 illustrates a second example process for utilizing a domain-variant messaging frame in accordance with one embodiment.

FIG. 6 illustrates steps of another example process 600 for communicating this change in state information across multiple domains that can be used in accordance with one embodiment. As mentioned, a state change occurs in one frame for a first domain 602 that causes a message to be sent to the messaging frame 604. If the messaging frame is not in the same domain 606, and thus the message cannot be delivered, then the first domain can attempt to retry sending the message until the messaging frame is in the same domain and the messaging frame is able to receive the message. As discussed above, one or more of these messaging frames can be provided to allow for communication between two or more different domains, but at any given time each of these frames typically will only "reside" in a single domain. Thus, a message sent to that messaging frame from another domain will result in an exception or other error as the message cannot be received by the messaging frame when the frame is in another domain. The method thus can utilize a retry mechanism wherein a domain, frame, or other such element can be configured to retry sending the message to the messaging frame at a specified interval, such as every half second or at any other appropriate interval. The frame can continue to retry until an event occurs corresponding to the message being received by the messaging frame, which can include events from a confirmation message being received from the messaging frame to simply not receiving an exception when sending the message.

An approach in accordance with another embodiment can utilize a messaging queue to hold messages that are waiting for the messaging frame. There can be one queue for each domain that is able to receive and hold messages from that domain and then deliver the message when the messaging frame is in the respective domain. In such a situation, the messaging frame can be configured to check the queue when switching to another domain in order to pull any waiting message. In another embodiment, the messaging queue can periodically pole the messaging frame to determine when the messaging frame is in the same domain and is able to receive the message.

In some cases, a domain can engage in a polling or listening process to determine when the messaging frame is in the same domain. While the messaging frame is in a different domain, a permission denied or similar exception can be returned. Once the messaging frame transitions to the same domain, any message from another domain can be received and/or processed, and a confirmation or other message can be sent to the messaging frame to be passed to another domain, or at least cause the messaging frame to transition to another domain.

In this example, once the messaging window receives the message from the first domain, the messaging window switches domains as specified by the message 608 and delivers the message to the target in the second domain 610. A response or other message may be received from the second domain once the second domain processes (or at least receives) the message. If a message is received 612, the messaging window switches to the domain specified by the message 614 and delivers the message to the target in that domain 616. This can be the first domain or another domain of the page.

If the messaging frame is configured to only switch domains when instructed, a problem can arise in that the messaging frame can get "stuck" in one domain unless that domain sends an instruction to switch domains. If another domain wishes to send a message using the messaging frame, there is no way for that other domain to contact the messaging frame in order to ask or instruct the messaging frame to switch domains while still preserving the messages currently being handled by the messaging frame. Some embodiments can utilize functionality such as hidden forms and anchor tags, or specific JavaScript, for example, to re-appropriate the messaging frame to a specific domain as needed. Unfortunately, such approaches are not able to maintain any state information or messages currently being stored by the messaging window. An alternative approach in accordance with one embodiment allows the messaging frame to include logic and/or be configured such that each domain that might access the messaging frame is "registered" with the messaging frame, and the messaging frame is able to switch to each of these domains at a specified interval when not being used by a current domain. Thus, the messaging frame will be able to receive messages from any of the domains without substantial delay or risk of the messaging frame getting stuck in one domain. Further, there is no loss of state or message information as a result of the domain transition. In cases where one or more domains will primarily be sending messages via the messaging frame, the messaging frame can be configured to switch to those domains more frequently than other domains which will not send messages as frequently. In some embodiments, each registered domain can have a time period, frequency, or other such parameter set to specify when the messaging frame should switch to that domain. Many other similar approaches should be apparent to one of ordinary skill in the art in light of the teachings and suggestions contained herein.

In the present example, if a message is not received from the second domain then a determination is made as to whether a specified amount of time has elapsed 618. If not, the messaging window continues to wait for a message from the second domain. This can include listening, polling, or any other appropriate procedure. If the specified amount of time has elapsed, the messaging window can switch to a specified domain 620 in order to prevent the messaging window from getting stuck in a particular domain as discussed elsewhere herein. The process then can continue from either steps 616 or 620, waiting for either a change in state or a specified time to be exceeded, when the messaging window can again change state. As should be understood, the steps are examples and there can be a number of variations, additions, and/or substations of steps in such a process, and the ordering of the steps can vary between embodiments.

Even though a messaging frame as discussed above can allow for communications between domains, and thus can provide an opportunity for a third party to manipulate the content, the risk from attack using such an approach is minimal. As discussed, even if one of the frames is compromised, or if a user is directed to a link or location that allows a third party to send unauthorized messages to the messaging frame, the messaging frame can correspond to an agreed-upon interface definition, such that the messaging frame can only cause a site or page to do something that the page is already authorized to do. For example, a messaging frame can be "hijacked" such that the messaging frame continually instructs a frame in another domain to continually show a particular page, or have a particular state, and returns back to the hijacked domain. While this may provide for a poor user experience, as the style or content displayed may not correspond to the actual or intended state of a page, there is no risk of a third party redirecting the frame to an unauthorized domain, uploading malicious content, downloading information, or performing any other such malicious activity.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker).

Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of communicating between frames of a page having content from different domains, comprising:
    under control of one or more computer systems configured with executable instructions,
        receiving indication of a change in state of content for a first frame of the page, the content for the first frame corresponding to a first domain;
        sending a message to a messaging frame of the page corresponding to the first domain, the message including information about the change in state and including a target destination for a second domain;
        switching the messaging frame to correspond to the target destination of the second domain;
        updating a state of a second frame of the page corresponding to the second domain in response to the information about the change in state of the content for the first frame; and
        specifying a set of messages that are able to be sent between the first and second domains using the messaging frame,
        wherein the first and second frames of the page corresponding to the respective first and second domains are restricted from direct communication and messages outside the specified set are not able to be sent between the first and second domains using the messaging frame.

2. The computer-implemented method of claim 1, wherein the message received from the first frame indicating the change in state is generated in response to a user action with respect to the first frame.

3. A computer-implemented method of providing cross-domain communications, comprising:
    under control of one or more computer systems configured with executable instructions,
        receiving a message from a first domain to a messaging element in the first domain, the message including state information for the first domain and a target destination in a second domain;
        transitioning the messaging element to the second domain; and
        providing the state information to the target destination in the second domain; and
        when a message is received from a domain other than a current domain of the messaging element, storing the message to a message queue until the messaging element is in the same domain as the message and is able to receive the message,
        wherein the first and second domains are restricted from direct communication in the environment of the messaging element.

4. The computer-implemented method of claim 3, wherein the second domain is configured to perform an action in response to receiving the state information.

5. The computer-implemented method of claim 3, further comprising:
    receiving a response message from the second domain to the messaging element in the second domain;
    transitioning the messaging element to the first domain; and
    providing the response message for the first domain.

6. The computer-implemented method of claim 3, further comprising:
    receiving a message from one of the first and second domains to the messaging element when in the same domain, the message including state information and a target destination in a third domain;
    transitioning the messaging element to the third domain; and
    providing the state information to the target destination in the third domain.

7. The computer-implemented method of claim 3, further comprising:
    transitioning the messaging element to a specified domain after a period of inactivity in a current domain of the messaging element.

8. The computer-implemented method of claim 3, wherein the environment of the messaging element comprises a page having a frameset, the frameset including a frame for at least one messaging element and at least one frame for each of the first and second domains.

9. The computer-implemented method of claim 8, wherein the messaging element is a hidden frame of the frameset.

10. The computer-implemented method of claim 3, wherein the message further includes a return location indicating a domain to which the messaging window should return after the state information is provided to the target destination in the second domain.

11. The computer-implemented method of claim 3, wherein the message received from the first domain is generated in response to a user action with respect to the first domain.

12. The computer-implemented method of claim 3, further comprising:
    specifying a set of messages that are able to be sent between the first and second domains using the messaging element,
    wherein messages outside the set are not able to be sent between the first and second domains using the messaging element.

13. The computer-implemented method of claim 3, further comprising:
    specifying at least one retry interval wherein one of the first or second domains is operable to keep sending a message to the messaging window at the retry interval until the messaging window is in the same domain and able to receive the message.

14. The computer-implemented method of claim 3, further comprising:
    checking the message queue for messages when the messaging window transitions to a different domain.

15. The computer-implemented method of claim 3, wherein the messaging queue is operable to send the stored message to the messaging element when the messaging element is in the same domain, the messaging queue being operable to modify the message to communicate with the second domain and provide the messaging window with a return location in the first domain.

16. The computer-implemented method of claim 3, wherein at least one component of the first and second domains is configured to periodically poll the message element to determine when the messaging element is in the respective domain and holds a message for the respective domain.

17. A system for providing cross-domain communications, comprising:
    a processor; and
    a memory device including instructions that, when executed by the processor, cause the processor to, at least:
        specify a set of messages that are able to be sent between a first domain and a second domain using a messaging element;
        receive a message from the first domain to the messaging element in the first domain, the message including state information for the first domain and a target destination in the second domain;
        transition the messaging element to the second domain; and
        provide the state information to the target destination in the second domain,
        wherein the first and second domains are restricted from direct communication in the environment of the messaging element and messages outside the specified set are not able to be sent between the first and second domains using the messaging element.

18. The system of claim 17, wherein the instructions, when executed by the processor, further cause the processor to:
    receive a subsequent message from one of the first and second domains to the messaging element when the messaging element is in the same domain;
    transition the messaging element to a domain specified by the subsequent message; and
    provide the subsequent message for the specified domain.

19. The system of claim 17, wherein the message received from the first domain is generated in response to a user action with respect to the first domain.

20. One or more computer-readable storage media having collectively thereon computer-executable instructions that configure one or more computers to collectively, at least:
    specify a set of messages that are able to be sent between a first domain and a second domain using a messaging element;
    receive a message from the first domain to the messaging element in the first domain, the message including state information for the first domain and a target destination in the second domain;
    transition the messaging element to the second domain; and
    provide the state information to the target destination in the second domain,
    wherein the first and second domains are restricted from direct communication in the environment of the messaging element and messages outside the specified set are not able to be sent between the first and second domains using the messaging element.

21. The one or more computer-readable storage media of claim 20, wherein the message received from the first domain is generated in response to a user action with respect to the first domain.

* * * * *